US012688418B2

(12) United States Patent
Colbert et al.

(10) Patent No.: US 12,688,418 B2
(45) Date of Patent: Jul. 21, 2026

(54) QUANTIZATION-AWARE TRAINING WITH NUMERICAL OVERFLOW AVOIDANCE FOR NEURAL NETWORKS

(71) Applicants: Advanced Micro Devices, Inc., Santa Clara, CA (US); ATI Technologies ULC, Markham (CA)

(72) Inventors: Ian Charles Colbert, San Diego, CA (US); Mehdi Saeedi, Markham (CA); Arun Coimbatore Ramachandran, Whitefield (IN); Chandra Kumar Ramasamy, Whitefield (IN); Gabor Sines, Markham (CA); Prakash Sathyanath Raghavendra, Whitefield (IN); Alessandro Pappalardo, Milan (IT)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 781 days.

(21) Appl. No.: 18/065,393

(22) Filed: Dec. 13, 2022

(65) Prior Publication Data

US 2024/0193413 A1     Jun. 13, 2024

(51) Int. Cl.
G06N 3/08 (2023.01)
(52) U.S. Cl.
CPC ...................................... G06N 3/08 (2013.01)
(58) Field of Classification Search
None
See application file for complete search history.

(56) References Cited

U.S. PATENT DOCUMENTS

| | | | |
|---|---|---|---|
| 5,058,034 A | 10/1991 | Murphy et al. | |
| 6,192,360 B1 | 2/2001 | Dumais et al. | |
| 11,551,054 B2 * | 1/2023 | Choi ......................... | G06N 3/04 |
| 2018/0225116 A1 | 8/2018 | Henry et al. | |
| 2019/0347550 A1 | 11/2019 | Jung et al. | |
| 2020/0134376 A1 | 4/2020 | Sallee | |
| 2021/0406690 A1 | 12/2021 | Ramachandran et al. | |

OTHER PUBLICATIONS

Srivastava et al., Dropout: A Simple Way to Prevent Neural Networks from Overfitting; Journal of Machine Learning Research 15 (2014); pp. 1929-1958; (Year: 2014).*

(Continued)

*Primary Examiner* — Alan Chen
(74) *Attorney, Agent, or Firm* — Kowert, Hood, Munyon, Rankin & Goetzel, P.C.; Rory D. Rankin

(57) ABSTRACT

An apparatus and method for efficiently creating less computationally intensive nodes for a neural network. In various implementations, a computing system includes a memory that stores multiple input data values for training a neural network, and a processor. Rather than determine a bit width P of an integer accumulator of a node of the neural network based on bit widths of the input data values and corresponding weight values, the processor selects the bit width P during training. The processor adjusts the magnitudes of the weight values during iterative stages of training the node such that an L1 norm value of the weight values of the node does not exceed a corresponding weight magnitude limit.

20 Claims, 6 Drawing Sheets

(56)                References Cited

OTHER PUBLICATIONS

Salimans et al., Weight Normalization: A Simple Reparameterization to Accelerate Training of Deep Neural Networks; arXiv: 1602.07868v3 [cs.LG] Jun. 4, 2016; Total pp. 11 (Year: 2016).*

Xie et al., Accelerating Neural Network Inference by Overflow Aware Quantization; arXiv:2005.13297v1 [cs.CV] May 27, 2020; Total pp. 9 (Year: 2020).*

Thierens, Dirk. "Non-redundant genetic coding of neural networks." Proceedings of IEEE International Conference on Evolutionary Computation. IEEE, 1996. (Year: 1996), 5 pgs.

Courbariaux, et al., "BinaryConnect: Training Deep Neural Networks with Binary Weights During Propagations", NIPS'15: Proceedings of the 28th International Conference on Neural Information Processing Systems—vol. 2, Dec. 2015, 9 pages, https://proceedings.neurips.cc/paper/2015/file/3e15cc11f979ed25912dff5b0669f2cd-Paper.pdf. [Retrieved Jan. 18, 2020].

Jacob, et al., "Quantization and Training of Neural Networks for Efficient Integer-Arithmetic-Only Inference", Proceedings of the IEEE Conference on Computer Vision and Pattern Recognition (CVPR), Dec. 15, 2017, 14 pages, https://arxiv.org/pdf/1712.05877.pdf. [Retrieved Jan. 17, 2020].

Choi, et al., "PACT: Parameterized Clipping Activation for Quantized Neural Networks", IBM Research AI, Jul. 17, 2018, 15 pages, https://arxiv.org/pdf/1805.06085.pdf. [Retrieved Jan. 17, 2020].

Krishnamoorthi, Raghuraman, "Quantizing Deep Convolutional Networks for Efficient Inference: A Whitepaper", Jun. 21, 2018, 36 pages, https://arxiv.org/pdf/1806.08342.pdf. [Retrieved Jan. 17, 2020].

Zhao, et al., "Improving Neural Network Quantization without Retraining Using Outlier Channel Splitting", Proceedings of the 36th International Conference on Machine Learning, May 22, 2019, 10 pages, https://arxiv.org/pdf/1901.09504.pdf. [Retrieved Jan. 17, 2020].

Choukroun, et al., "Low-Bit Quantization of Neural Networks for Efficient Inference", 2019 IEEE/CVF International Conference on Computer Vision Workshop (ICCVW), Mar. 25, 2019, 10 pages, https://arxiv.org/pdf/1902.06822.pdf. [Retrieved Jan. 17, 2020].

Anonymous Authors, "ACIQ: Analytical Clipping for Integer Quantization of Neural Networks", ICLR 2019 Conference Blind Submission, Sep. 2018, 11 pages, https://openreview.net/references/pdf?id=rkKmMJqCQ. [Retrieved Jan. 17, 2020].

Migacz, Szymon, "8-Bit Inference with TensorRT", NVIDIA, May 8, 2017, 41 pages, https://on-demand.gputechconf.com/gtc/2017/presentation/s7310-8-bit-inference-with-tensorrt.pdf. [Retrieved Feb. 18, 2021].

Wu, Hao, "Low Precision Inference on GPU", NVIDIA, 2019, 60 pages, https://developer.download.nvidia.com/video/gputechconf/gtc/2019/presentation/s9659-inference-at-reduced-precision-on-gpus.pdf. [Retrieved Feb. 18, 2021].

Xu, Jiawei, et al. "A low-power arithmetic element for multi-base logarithmic computation on deep neural networks." 2018 31st IEEE International System-on-Chip Conference (Socc). IEEE, 2018. (Year: 2018).

Choukroun, Yoni, et al. "Low-bit quantization of neural networks for efficient inference." 2019 I EEE/CVF International Conference on Computer Vision Workshop (ICCVW). IEEE, 2019. (Year: 2019).

Helwegen, Koen, et al. "Latent weights do not exist: Rethinking binarized neural network optimization." Advances in neural information processing systems 32 (2019). (Year: 2019).

International Search Report and Written Opinion of International Application No. PCT/US2024/033580, mailed Oct. 2, 2024, 12 pp.

Nilesh Prasad Pandey et al: "A Practical Mixed Precision Algorithm for Post-Training Quantization", arxiv.org, Cornell University Library, 201 Olin Library Cornell University Ithaca, NY 14853, Feb. 10, 2023 (Feb. 10, 2023), 10 pp.

Sangeetha Siddegowda et al: "Neural Network Quantization with AI Model Efficiency Toolkit (AIMET)", arxiv.org, Cornell University Library, 201 Olin Library Cornell University Ithaca, NY 14853, Jan. 20, 2022 (Jan. 20, 2022), 39 pp.

* cited by examiner

*Neuron 200*

*Method*
*300*

Method
500

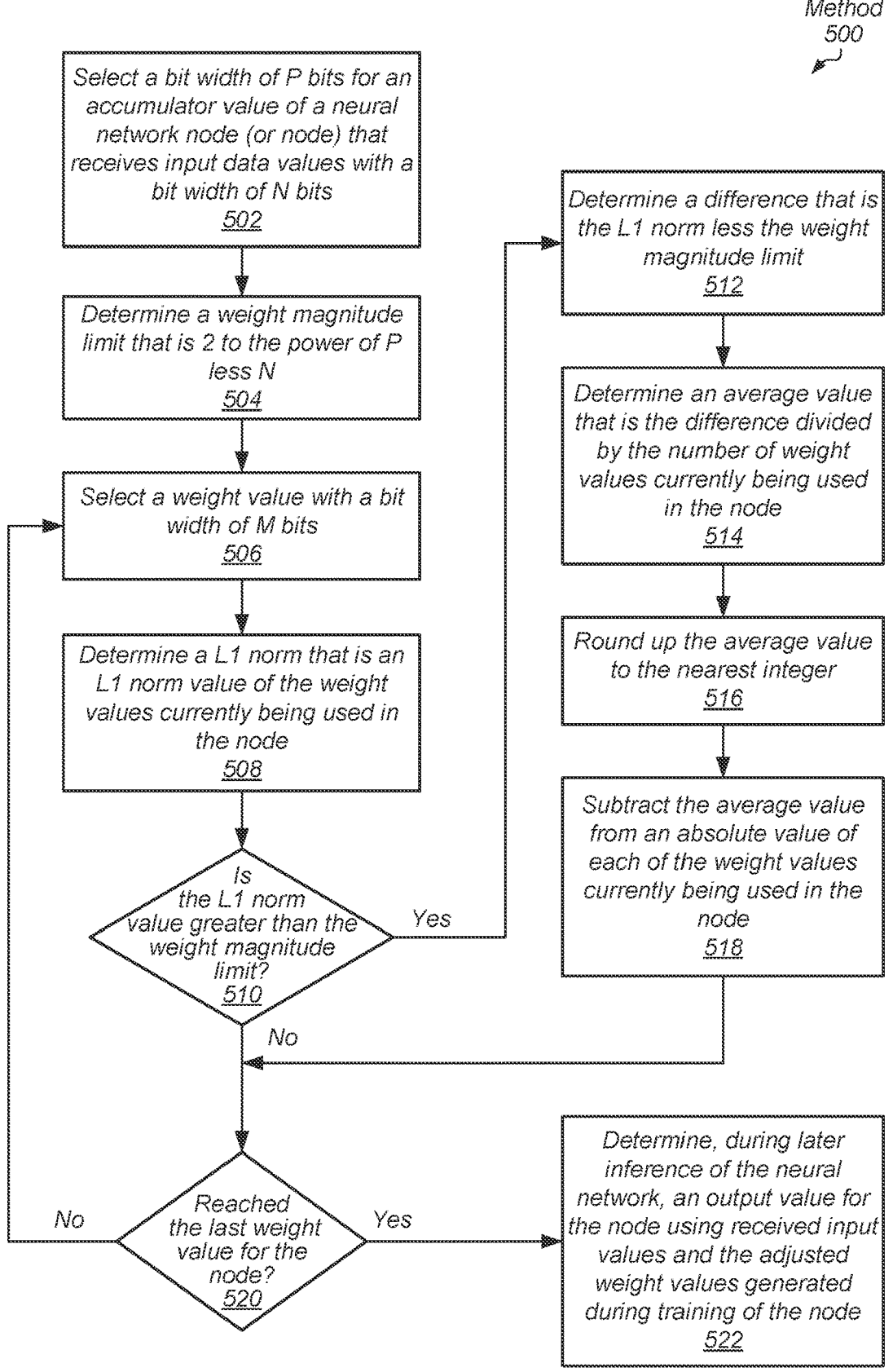

Select a bit width of P bits for an accumulator value of a neural network node (or node) that receives input data values with a bit width of N bits
502

Determine a weight magnitude limit that is 2 to the power of P less N
504

Select a weight value with a bit width of M bits
506

Determine a L1 norm that is an L1 norm value of the weight values currently being used in the node
508

Is the L1 norm value greater than the weight magnitude limit?
510

Yes

Determine a difference that is the L1 norm less the weight magnitude limit
512

Determine an average value that is the difference divided by the number of weight values currently being used in the node
514

Round up the average value to the nearest integer
516

Subtract the average value from an absolute value of each of the weight values currently being used in the node
518

No

Reached the last weight value for the node?
520

No

Yes

Determine, during later inference of the neural network, an output value for the node using received input values and the adjusted weight values generated during training of the node
522

FIG. 5

QUANTIZATION-AWARE TRAINING WITH NUMERICAL OVERFLOW AVOIDANCE FOR NEURAL NETWORKS

BACKGROUND

Description of the Relevant Art

Neural networks are used in a variety of applications in a variety of fields such as physics, chemistry, biology, engineering, social media, finance, and so on. Some of the applications that use neural networks are text recognition, image recognition, speech recognition, blood disease and other medical conditions recognition, and so on. Neural networks use one or more layers of nodes to classify data in order to provide an output value representing a prediction when given a set of inputs. During training of the neural network, predetermined training input data is sent to the first layer of the neural network. Weight values are determined and sent to the one or more layers of the neural network. The weight values determine an amount of influence that a change in a particular input data value will have upon a particular output data value within the one or more layers of the neural network. In some designs, initial weight values are pseudo-random generated values. As training occurs, the weight values are adjusted based on comparisons of generated output values to predetermined training output values.

When training completes, a computing system uses the trained neural network to generate predicted output values. These predicted output values are based on at least the trained weight values and a new set of input data values provided in the field of use. However, the trained neural network typically uses a high number of computations to provide the predicted output values. Therefore, system cost increases to provide hardware resources that can process the relatively high number of computations in a suitable timeframe. If an organization cannot support the high cost of using the trained neural network, then the organization is unable to benefit from the trained neural network.

In view of the above, efficient methods and apparatuses for creating less computationally intensive nodes for a neural network are desired.

BRIEF DESCRIPTION OF THE DRAWINGS

FIG. 5 is a generalized block diagram of a method for adjusting magnitudes of weight values of a neural network while maintaining a fixed size of accumulator values.

Figure 1:
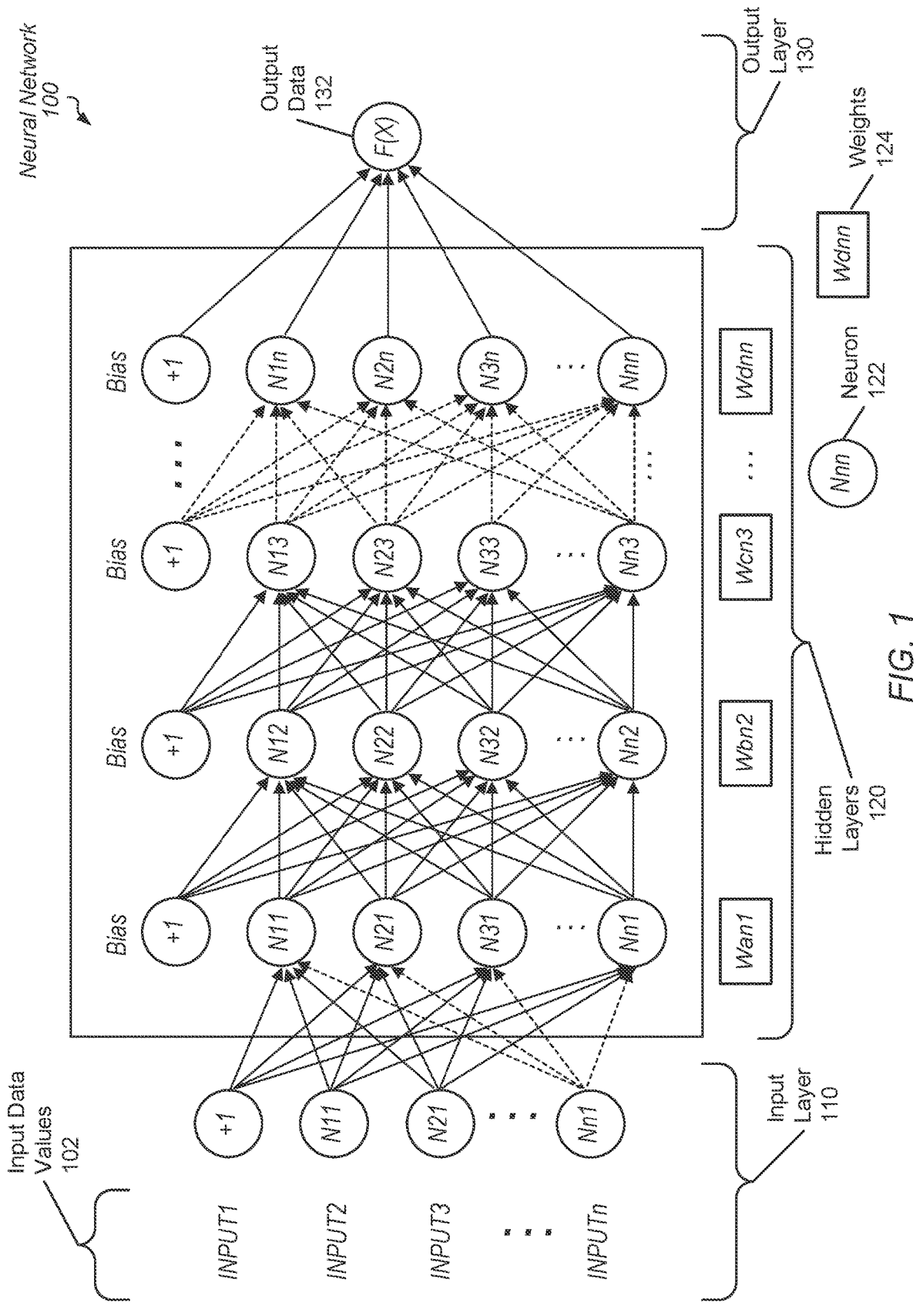
FIG. 1 is a generalized block diagram of a neural network that includes less computationally intensive nodes.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently creating less computationally intensive nodes for a neural network are contemplated. In various implementations, a computing system includes a memory with circuitry that stores multiple input data values for training a neural network. The neural network is a data model that implements one of a variety of types of a neural network. Examples of the neural network are one of multiple types of convolutional neural networks, recurrent neural networks, and transformers. The neural network classifies data or performs a function in order to provide an output that represents a prediction when given a set of input data values. To do so, the neural network uses one or more layers of nodes (or neurons) between an input layer and an output layer of nodes. Each node has a specified activation function and one or more specified weight values that are determined during training of the neural network.

Each node of a neural network layer (or layer) combines a particular received input data value with a particular weight value. Typically, the nodes use matrix multiplication such as General Matrix Multiplication (GEMM) operations. In some implementations, the neural network includes a single layer with hundreds or more nodes performing computations for edge computing applications. In other implementations, the neural network includes an input layer, an output layer, and one or more hidden layers between the input layer and the output layer. The nodes of the hidden layers, other than a last hidden layer, are not directly connected to the output layer. The input layer, the one or more hidden layers, and the output layer can perform millions or billions of computations to provide predicted output values for the neural network. Neural networks with a relatively high number of hidden layers are also referred to as deep neural networks (DNNs). It is noted that, as used herein, the term "neural network" refers to single-layer neural networks and the term can refer to deep neural networks (DNNs) with the relatively high number of hidden layers. The term "neural network" can also be used to refer to a neural network that includes an input layer, the one or more hidden layers, and the output layer where the number of hidden layers is less than the relatively high number used to classify a deep neural network (DNN).

To create less computationally intensive nodes for the neural network used during inference, the circuitry of a processor determines, during training, whether quantization is used during later inference. In other words, the processor replaces the floating-point input data values with smaller input data values. For example, in one implementation, the processor replaces a 32-bit floating-point input data value with an 8-bit fixed-point input data value to be used in an integer matrix multiply and accumulate (MAC) operation. In other implementations, the processor replaces the floating-point input data value with a smaller input data value that is another type of input data value besides a fixed-point value such as a smaller floating-point input data value. However, the accumulator portion of the MAC operation would still use a 32-bit integer bit width to prevent numerical overflow.

The number of accumulations, which can be represented by K, performed in the node before sending an output value to an activation function can be a relatively high number. Here, K is a positive, non-zero integer that is relatively high. In some neural networks, a limit is set on the bit width of the accumulator, which can be represented by the positive, non-zero integer P. The data size (bit width P) of the accumulator register is the number P of bits used to represent the accumulator value that is stored in the accumulator register. It is noted that the data size (bit width N) of an input data register is the number N of bits used to represent the input data value that is stored in the input data register. The input data value can use a signed data type or an unsigned data type. Similarly, the data size (bit width M) of a weight register is the number M of bits used to represent the magnitude of the weight value that is stored in the weight register. Typically, the weight value uses the signed data type. Each of the values N and M is a positive, non-zero integer. These registers that store the accumulator value, the input data value, and the magnitude of the weight value use a data storage area that is implemented with one of a variety of data storage circuits such as flip-flop circuits, a random-access memory (RAM), a content addressable memory (CAM), a set of registers, a first-in-first-out (FIFO) buffer, or other.

The limit on the bit width P is set by changing the bit width of the integer input data values (represented by the positive, non-zero integer N) and the bit width of the integer weight values (represented by the positive, non-zero integer M). However, the circuitry of the processor is capable of foregoing these steps, and instead selects upfront the bit width P of the accumulator. In some implementations, the bit width P is based on the neural network being trained on other particular input data sets, and the smallest sizes (bit widths) of the accumulators for different layers that still prevent numerical overflow for those particular input data sets are known from the corresponding training. Based on both the selected bit width P of the accumulator and the bit width N of the integer input data values for the node, during training, the processor determines a bound on the magnitudes of the integer weight values. This bound on the magnitudes of the weight values (or weight values) determines the bit width M of the weight values.

In various implementations, when each of the input data values and the weight values use the signed data type, as the processor determines weight values during training, the processor determines a weight magnitude limit as two to a power of P less N, or $2^{(P-N)}$. When the input data values use the unsigned data type and the weight values use the signed data type, as the processor determines weight values during training, the processor determines a weight magnitude limit as two to a power of P less N less one, or $2^{(P-N-1)}$. Typically, the weight values use the signed data type, whereas, the input data values use either the signed data type or the unsigned data type. The processor uses this weight magnitude limit to determine the updated magnitudes of the weight values. In one example, the bit width N of the input data values that use the signed data type is 8 bits, and the selected bit width P of the accumulator is 20 bits. In this example, the weight magnitude limit is two to a power of 20 less 8, or $2^{(20-8)}$, or $2^{12}$, or 4,096. The processor uses this weight magnitude limit of 4,096 to determine the magnitudes of the updated weight values.

During training of the neural network, the processor compares the weight magnitude limit to an L1 norm value. The processor determines the L1 norm value as a sum of the absolute values of the magnitude of the current weight value and the one or more magnitudes of a set of weight values generated previously for the node. In one example, a current third weight value has a magnitude of 2,048. A previous first weight value of the set of weight values is 2,560, and a previous second weight value of the set of weight values is −1,280. The previous first weight value was combined (using GEMM) with a corresponding first input data value, the previous second weight value was combined (using GEMM) with a corresponding second input data value, and now the current third weight value would be combined with a corresponding third input data value. The magnitudes of the previous first weight value and the previous second weight value are 2,560 and 1,280, respectively. The sum of the absolute values of the weight values, or the L1 norm, is (2,560+1,280+2,048), or 5,888. Since the L1 norm is greater than the weight magnitude limit of 4,096, the processor reduces each of the magnitudes of the weight values.

When reducing the magnitudes of the weight values to cause the L1 norm to no longer be greater than the weight magnitude limit, the processor can use one of multiple weight value reduction techniques. In this example, the processor uses a weight value reduction technique that includes subtracting a same integer from each of the absolute values of the magnitudes of the multiple weight values. However, other weight value reduction techniques are possible and contemplated, and a further description of some of these weight value reduction techniques is provided in the description of the FIGS. 1-6. Continuing with this example, the processor determines an adjustment value to subtract from the absolute values of the magnitudes of the weight values. First, the processor determines a difference between the L1 norm and the weight magnitude limit. Continuing with the above example, the difference is (5,888−4,096), or 1,792. Second, the processor determines an average value by dividing the difference by a number of the one or more previous weight values plus one for the current weight value. In this example, the number of weight values is three (two previous weight values plus one for the current weight value), so the average value is (1,792/3), or 597.33. Third, the processor determines the adjustment value by rounding up the average value to a next largest integer. In this example, the adjustment value is 597.33 rounded up to 598, which is the next largest integer.

Afterward, the processor determines an updated magnitude is an absolute value of a corresponding magnitude of the particular weight value less the adjustment value. In this example, the updated first magnitude is (2,560−598), or 1,962. The updated second magnitude is (1,280−598), or 682. The updated third magnitude is (2,048−598), or 1,450. It is noted that the second weight value is actually −682, but the absolute value of the second magnitude is 682. Now, the updated L1 norm is (1,962+682+1,450), or 4,094. The updated L1 norm is no longer greater than the weight magnitude limit of 4,096. Therefore, the bit width M of the magnitudes of the weight values remains as 12 bits. It is noted that the total bit width of the weight values using the signed data type is 13 bits, since one bit is used to provide the sign of the weight value. The bit width N of the input data values remains as 8 bits, and the selected bit width P of the accumulator remains as 20 bits. The size of the accumulator register (bit width P) decreases while still preventing numerical overflow for the node. As described earlier, besides subtracting a same integer from each of the absolute values of the magnitudes of the multiple weight values, other weight value reduction techniques are possible and contemplated. Further details of some of these weight value reduction techniques along with other steps performed by the hardware of the processor to create less computationally intensive nodes for the neural network are provided in the following discussion of FIGS. 1-6.

Referring to FIG. 1, a generalized diagram is shown of a neural network 100 that includes less computationally intensive nodes. The neural network 100 is a data model that implements one of a variety of types of a neural network. Examples of the neural network are one of multiple types of convolutional neural networks and recurrent neural networks. The neural network 100 classifies data in order to provide output data 132 that represents a prediction when given a set of inputs. To do so, the neural network 100 uses an input layer 110, one or more hidden layers 120, and an output layer 130. Each of the layers 110, 120 and 130 includes one or more neurons 122 (or nodes 122). Each of these neurons 122 receives input data such as the input data values 102 in the input layer 110. In the one or more hidden layers 120 and the output layer 130, each of the neurons 122 receives input data as output data from one or more neurons 122 of a previous layer. These neurons 122 also receive one or more weight values 124 that are combined with corresponding input data.

It is noted that in some implementations, the neural network 100 includes only a single layer, rather than multiple layers. Such single-layer neural networks are capable of performing computations for at least edge computing applications. In other implementations, the neural network 100 has a relatively high number of hidden layers 120, and the neural network 100 is referred to as a deep neural network (DNN). Each of the neurons 122 of the neural network 100 combines a particular received input data value with a particular one of the weight values 124. Typically, the neurons 122 use matrix multiplication, such as General Matrix Multiplication (GEMM) operations, to perform the combining step. Circuitry of a processor (not shown) performs the steps defined in each of the neurons 122 (or nodes 122) of the neural network 100. For example, the hardware, such as circuitry, of the processor performs at least the GEMM operations of the neurons 122. In some implementations, the circuitry of the processor is a data-parallel processing unit that includes multiple compute units, each with multiple lanes of execution that supports a data-parallel microarchitecture for processing workloads.

The input layer 110 includes the initial input values 102 for the neural network 100. During training, these initial input values 102 are predetermined values used for training the neural network 100. The bias ("Bias") values represent a difference or shift of the prediction values provided by the neurons 122 from their intended values. A relatively high value for a particular bias indicates that the neural network 100 is assuming more than accurately predicting output values that should align with expected output values. A relatively low value for the particular bias indicates that the neural network 100 is accurately predicting output values that should align with expected output values. The weight values 124 indicate an amount of influence that a change of a corresponding input data value has on a change of the output data value of the particular neuron. A relatively low weight value indicates a change of a corresponding input data value provides little change of the output value of the particular neuron. In contrast, a relatively high weight value indicates a change of the corresponding input data value provides a significant change of the output value of the particular neuron.

The neurons 122 of the hidden layers 120, other than a last hidden layer, are not directly connected to the output layer 130. Each of the neurons 122 has a specified activation function such as a unit step function, which determines whether a corresponding neuron will be activated. An example of the activation function is the rectified linear unit (ReLU) activation function, which is a piecewise linear function used to transform a weighted sum of the received input values into the activation of a corresponding one of the neurons 122. When activated, the corresponding neuron generates a non-zero value, and when not activated, the corresponding neuron generates a zero value.

The activation function of a corresponding one of the neurons 122 receives the output of a matrix multiply and accumulate (MAC) operation. This MAC operation of a particular neuron of the neurons 122 combines each of the received multiple input data values with a corresponding one of multiple weight values of the weight values 124. The number of accumulations, which can be represented by K, performed in the particular neuron before sending an output value to an activation function can be a relatively high number. Here, K is a positive, non-zero integer that is a relatively high value.

In some implementations, a designer uses an application programming interface (API) to specify multiple characterizing parameters of the neural network 100. Examples of these parameters are a number of input data values 102 for the input layer 110, an initial set of weight values for the weights 124, a number of layers of the hidden layer 120, a number of neurons 122 for each of the hidden layers 120, an indication of an activation function to use in each of the hidden layers 120, a loss function to use to measure the effectiveness of the mapping between the input data values 102 and the output data 132, and so on. In some implementations, different layers of the hidden layers 120 use different activation functions.

The training process of the neural network 100 is an iterative process that finds a set of values for the weight values 124 used for mapping the input data values 102 received by the input layer 110 to the output data 132. The specified loss function evaluates the current set of values for the weight values 124. One or more of forward propagation and backward propagation used with or without gradient descent is used to minimize the cost function by inspecting changes in the bias, the previous activation function results, and the current set of values for the weight values 124.

To create less computationally intensive neurons 122 for the neural network 100, during training, the circuitry of a processor determines whether quantization is used during later inference. In other words, the processor replaces the floating-point versions of the input data values 102 with smaller fixed-point (integer) versions of the input data values 102. For example, the processor replaces a 32-bit floating-point input data value with an 8-bit fixed-point input data value to be used in an integer matrix multiply and accumulate (MAC) operation of a corresponding one of the neurons 122. However, such a step is insufficient, since the accumulator portion of the MAC operation would still use a 32-bit integer bit width to prevent numerical overflow.

As described earlier, the number of accumulations, which can be represented by K, can be a relatively high number. This number of accumulations is performed in the corresponding one of the neurons 122 before sending an output value to an activation function. Therefore, numerical over-flow is possible during the relatively high number K of accumulations performed for the MAC operation of the corresponding one of the neurons 122. Rather than determine a limit of the bit width of the accumulator (represented by P) by changing the bit width of the integer input data values 102 (represented by N) and the bit width of the integer weight values 124 (represented by M), the circuitry of the processor instead selects upfront the bit width P of the accumulator.

The processor adjusts the magnitudes of the weight values 124 during iterative stages of training the corresponding one of the neurons 122. For example, the processor ensures that an L1 norm value of the magnitudes of the weight values of the neuron does not exceed a weight magnitude limit. When each of the input data values and the weight values use the signed data type, as the processor determines weight values during training, the processor determines the weight magnitude limit as two to a power of P less N, or $2^{(P-N)}$. When the input data values use the unsigned data type and the weight values use the signed data type, as the processor determines weight values during training, the processor determines a weight magnitude limit as two to a power of P less N less one, or $2^{(P-N-1)}$. Typically, the weight values use the signed data type, whereas, the input data values use either the signed data type or the unsigned data type. Further details are provided in the following description of a neuron.

Figure 2:
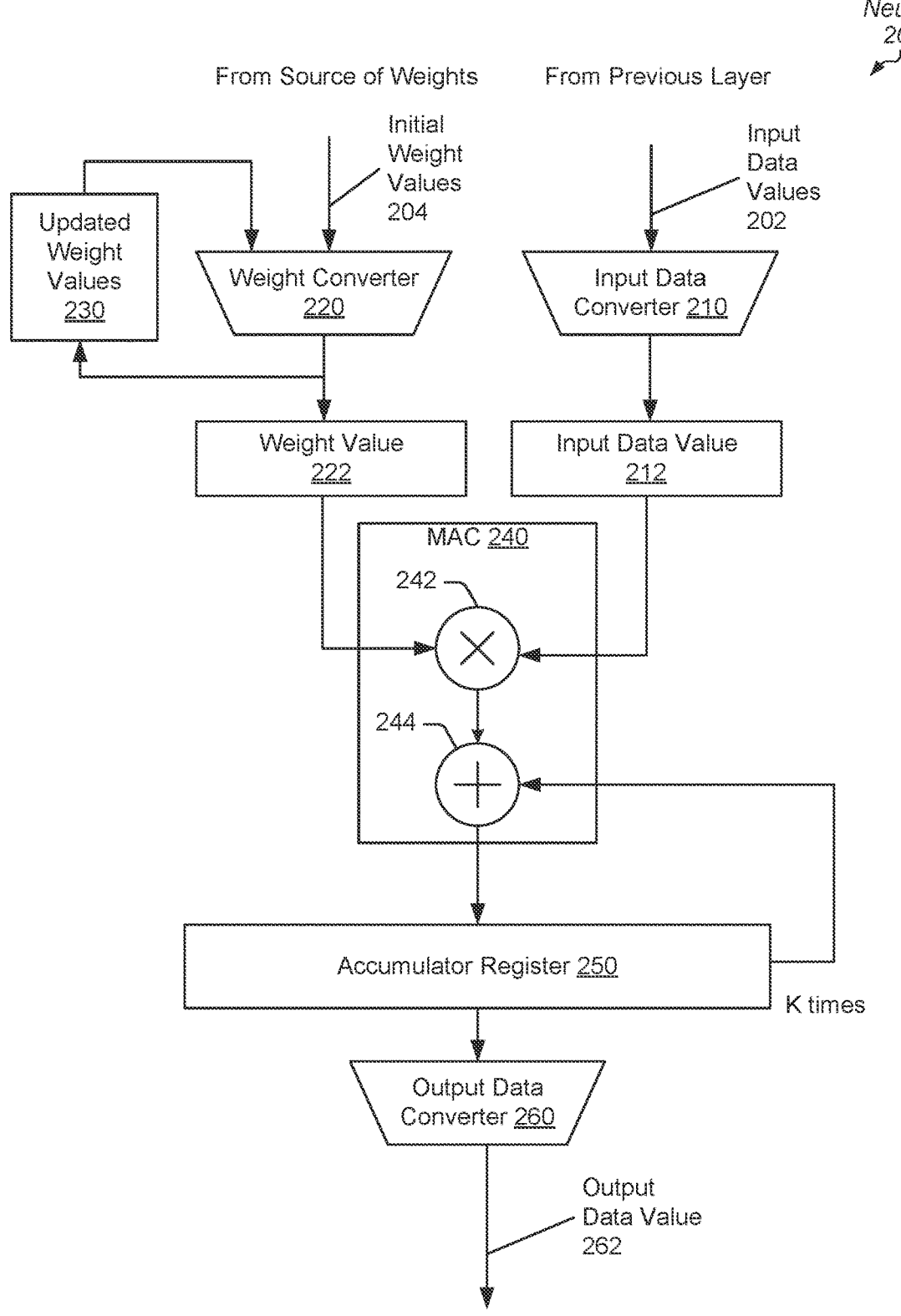
FIG. 2 is a generalized block diagram of a neuron that includes less computationally intensive operations

Turning now to FIG. 2, a generalized diagram is shown of a neuron 200 that includes less computationally intensive operations. As shown, the neuron 200 (or node 200) receives input data values 202 from a previous layer of a neural network, and receives initial weight values 204 from a source of weights. In some implementations, the source of weights is one of a variety of data storage areas that store the initial weight values 204 for the neuron 200. In an implementation, a designer generates pseudo-random values for the initial weight values 204. In another implementations, the designer generates the initial weight values 204 based on weight values of a similar type of another neural network. The neuron 200 generates the output data value 262, which is sent to a next layer of the neural network. The hardware of the neuron 200 uses the circuitry of the components 210-260 to generate the output data value 262.

The input data converter 210 receives the input data values 202 from a previous layer of a neural network. In some implementations, the input data converter 210 performs the steps of one or more operations such as shifting, rounding, and saturating. The data conversion steps performed by each of the input data converter 210 and the output data converter 260 is based on the data size (bit width) of the input data value 212 used by the matrix multiply and accumulate (MAC) circuit 240 and the data size (bit width) of the accumulator register 250. Typically, the bit width P of the accumulator register 250 is greater than the bit width N of the input data value 212. Here, each of P and N is a positive, non-zero integer. At a later time when training has completed, the processor executing the neural network makes predictions, or the processor infers, output values based on received input values. This processing of the neural network performed by the hardware of the processor after training has completed is referred to as "inference."

To create less computationally intensive operations for the neuron 200 when performing later inference, the circuitry of a processor uses quantization during the current training. In other words, the processor replaces the initial versions of the input data values with smaller versions of the input data values. For example, the processor replaces a 32-bit float-ing-point input data value with an 8-bit fixed-point input data value to be used in an integer operation by the MAC circuit 240. In some implementations, the data conversion to integer type is performed for the first layer of the neural network, and the multiple layers of the hidden layers use integer values throughout. Therefore, the input data value 212 and the weight value 222 are integer values. In other implementations, the processor replaces the 32-bit floating-point input data value with a smaller floating-point input data value, such as 12-bit floating-point value to be used in a floating-point operation by the MAC circuit 240.

The accumulator register 250 uses a data storage area that is implemented with one of a variety of data storage circuits such as flip-flop circuits, a random access memory (RAM), a content addressable memory (CAM), a set of registers, a first-in-first-out (FIFO) buffer, or other. In an implementation, one or more intermediate results generated by the neuron 200 are stored in local data storage that is not shown for ease of illustration. In some implementations, the output data value 262 is sent to an activation function circuit, and the output of the activation function circuit sends its output to the next layer of the neural network.

The matrix multiply and accumulate (MAC) circuit 240 uses the multiplier 242 to multiply a received input data value 212 and a received weight value 222. The MAC circuit 240 also uses the adder 244 to sum the product received from the multiplier 242 with products previously generated using other values of the input data value 212 and the weight value 222. For example, the neuron 200 receives a corresponding one of the input data values 202 from each of the neurons in a previous layer of the neural network. Each of these input data values 202 has a corresponding one of the initial weight values 204, which is later updated by the weight converter 220. The accumulator register stores the current output from the MAC 240, and this stored value is also returned to the MAC 240 to be summed with a next multiplication result from the multiplier 242. The number of accumulations, which can be represented by K, performed in the neuron 200 before sending an output value to an activation function can be a relatively high number. Here, K is a positive, non-zero integer that is relatively high. In various implementations, K is equal to the number of neurons in the previous layer of the neural network.

Similar to the accumulator register 250, the updated weight values 230 are stored in a data storage area that is implemented with one of a variety of data storage circuits. In various implementations, the updated weight values 230 are determined based on minimizing an error between the generated output data value 262 (or an output of a corresponding activation function) and an expected output data value. Additionally, the weight converter 220 also generates the updated weight values. For example, during training of the neuron 200, the circuitry of the processor or other integrated circuit implementing the functionality of the weight converter 220 determines a bound on the magnitudes of the weight value 222. This bound, or limit, on the magnitude of the weight value 222 determines a bit width M of the weight value 222. Here, M is a positive, non-zero integer.

As described earlier, to create less computationally intensive operations for the neuron 200 when performing later inference, during the current training of the neural network, the circuitry of the processor uses quantization. In addition, the bit width P of the accumulator register 250 is reduced. Reducing the data size (bit width P) of the accumulator register 250 reduces the number P of bits used to represent the accumulator value stored in the accumulator register 250. Reducing the data size (bit width P) of the accumulator register 250 creates less computationally intensive nodes for the neural network and improves performance during inference of the neural network. However, reducing the bit width P can lead to numerical overflow when the neuron 200 performs later inference. Therefore, simply reducing the bit width P has a limit on the amount of reduction that can be achieved for the bit width P.

When each of the input data values and the weight values use the signed data type, this limit is set by the expression $\log_2(K)+N+M-1 \leq P$. When the input data values use the unsigned data type and the weight values use the signed data type, this limit is set by the expression $\log_2(K)+N+M \leq P$. It is noted that the value $\log_2(K)$ can be a floating-point value, so when these expressions are used, one or more of the values $\log_2(K)$ and P are rounded up to the next largest integer. As described earlier, the data size (bit width P) of the accumulator register is the number P of bits used to represent the accumulator value that is stored in the accumulator register. Therefore, the final value of the bit width P is a positive, non-zero integer.

Rather than determine the bit width P using either of the above two expressions, in various implementations, the circuitry of the weight converter 220 selects the bit width P prior to training the neuron 200. It is noted that the accumulator value that is stored in the accumulator register 250 can be an integer value or a floating-point value. In addition, the accumulator value that is stored in the accumulator register 250 can be initialized to a non-zero value. Following, during training of the neuron 200, the weight converter 220 generates weight values with magnitudes that support the selected bit width P. For example, in various implementations, as the weight converter 220 determines weight values during training, when each of the input data values and the weight values use the signed data type, the weight converter 220 determines a weight magnitude limit as two to a power of P less N, or $2^{(P-N)}$, and uses this weight magnitude limit to determine the updated weight values 230. When the input data values use the unsigned data type and the weight values use the signed data type, the weight converter 220 determines the weight magnitude limit as two to a power of P less N less one, or $2^{(P-N-1)}$.

The weight converter 220 adjusts the magnitudes of the updated weight values 230 during iterative stages of training of the neuron 200. For example, the weight converter 220 ensures that an L1 norm value of the current set of updated weight values 230 and the weight value 222 does not exceed the weight magnitude limit. By doing so, the weight converter 220 allows the data size (bit width P) of the accumulator register 250 to be set prior to training the neuron 200. Additionally, by using the above steps, the weight converter 220 also prevents numerical overflow. Therefore, the weight converter 220 is able to generate weight values used during inference by the neural network that support the selected data size (bit width P) of the accumulator register 250. The selected data size (bit width P), which is a reduced data size, of the accumulator register 250 creates less computationally intensive nodes for the neural network, improves performance during inference of the neural network, and prevents numerical overflow during inference of the neural network.

In one example, the bit width N of the input data value 212 is 8 bits, the input data values are signed integers, and the selected bit width P of the accumulator is 16 bits. In this example, the weight magnitude limit is two to a power of P less N, or $2^{(P-N)}$, or two to the power of 16 less 8, or $2^{(16-8)}$, or 28, or 256. During training of the neuron 200, the weight converter 220 uses this weight magnitude limit of 256 to generate the magnitudes of the updated weight values 230 and the weight value 222. During training, the weight converter 220 compares the weight magnitude limit to an L1 norm value. The weight converter 220 determines the L1 norm value as a sum of the absolute values of the magnitude of the current weight value 222 and the one or more magnitudes of the updated weight values 230 determined beforehand in the neuron 200.

In one example, the weight value 222 has a magnitude of 128, and the weight value 222 is the third weight value to be determined by the weight converter 220. Therefore, the weight converter 220 has already generated two previous weight values, which are included in the updated weight values 230. The updated weight values 230 includes one or more weight values generated previously for the node 200. A previous first weight value of the updated weight values 230 is 160, and a previous second weight value of the updated weight values 230 is −80. The magnitudes of the previous first weight value and the previous second weight value are 160 and 80, respectively. The sum, or the L1 norm, is (160+80+128), or 368. Since the L1 norm is greater than the weight magnitude limit of 256, the weight converter 220 reduces one or more of these three weight values.

When reducing one or more of the weight values to cause the L1 norm to no longer be greater than the weight magnitude limit of 256, the weight converter 220 can use one of multiple weight value reduction techniques. In this example, the circuitry of the weight converter 220 uses a weight value reduction technique that includes subtracting a same integer from each of the absolute values of the magnitudes of the multiple weight values 222 and 230. However, other weight value reduction techniques are possible and contemplated. In an implementation, the weight converter 220 determines an adjustment value to subtract from the absolute values of the magnitudes of the three weight values. First, the weight converter 220 determines a difference between the L1 norm and the weight magnitude limit. Continuing with the above example, the difference is (368−256), or 112. Second, the weight converter 220 generates an average value by dividing the difference by a sum of the number of the weight value 222 and the current set of updated weight values 230. In this example, the sum of the number of the two weight values of the updated weight values 230 and one for the weight value 222 is three. Therefore, the average value is (112/3), or 37.33. Third, the weight converter 220 generates the adjustment value by rounding up the average value to a next largest integer. In this example, the adjustment value is 37.33 rounded up to 38, which is the next largest integer.

Afterward, the weight converter 220 generates an updated magnitude is an absolute value of a corresponding magnitude of the particular weight value less the adjustment value. In this example, the updated first magnitude is (160−38), or 122. The updated second magnitude is (80−38), or 42. The updated third magnitude is (128−38), or 90. It is noted that the updated second weight value is actually −42, but the absolute value of the updated second magnitude is 42. Now, the updated L1 norm is (122+42+90), or 254. The updated L1 norm is no longer greater than the weight magnitude limit of 256.

The weight converter 220 stores the above three updated weight values in the updated weight values 230, and sends the updated version of the weight value 222 (the value 90, and not the value 128) to the MAC circuit 240. The bit width M of the weight values remains as 8 bits, the bit width N of the input data values remains as 8 bits, and the selected bit width P of the accumulator remains as 16 bits. It is noted that the total bit width of the weight values using the signed data type is 9 bits, since one bit is used to provide the sign of the weight value. The accumulator size (bit width P) decreases from a typical bit width of 32 bits to 16 bits while still preventing numerical overflow for the neuron 200. It is noted that different hidden layers of the neural network can have different data sizes (different values of the bit width P) of the accumulator registers 250 such that neurons in different hidden layers use different values of the bit width P. In addition, different hidden layers can have different data sizes of the input data values and the weight values (different bits widths N and M). Further, different hidden layers can use different weight value reduction techniques as further described in the below discussion.

In another implementation, the weight converter 220 performs the above steps until the average value of 37.33 is found, but then uses a different weight value reduction technique that includes different subsequent steps from the above steps. For example, the weight converter 220 uses this average value of 37.33 as the adjustment value. Therefore, the weight converter 220 determines the updated magnitudes of the weight values to be (160–37.33), (80–37.33), and (128–37.33). The updated magnitudes of the weight values are 122.67, 42.67, and 90.67. Now, the updated L1 norm is (122.67+42.67+90.67), or 256. The updated L1 norm is no longer greater than the weight magnitude limit of 256. The weight converter 220 stores these three updated weight values in the updated weight values 230, and sends the updated version of the weight value 222 (the value 90.67, and not the value 128) to the MAC circuit 240.

In yet another implementation, the weight converter 220 uses an adjustment value between the two average values described earlier. In other words, the weight converter 220 uses an adjustment value that is between 37.33 and 38. The weight converter 220 selects any value between 37.33 and 38 based on design requirements. For example, the weight converter 220 can select 37.5. Therefore, the weight converter 220 determines the updated magnitudes of the weight values to be (160–37.5), (80–37.5), and (128–37.5). The updated magnitudes of the weight values are 122.5, 42.5, and 90.5. Now, the updated L1 norm is (122.5+42.5+90.5), or 255.5. The updated L1 norm is no longer greater than the weight magnitude limit of 256. The weight converter 220 stores these three updated weight values in the updated weight values 230, and sends the updated version of the weight value 222 (the value 90.5, and not the value 128) to the MAC circuit 240.

In still yet another implementation, the weight converter 220 uses an adjustment value that is a scaling factor for each of the three above weight values. For example, the weight converter 220 determines a ratio of the weight magnitude limit to the L1 norm. The ratio is (256/368), or 0.696. The weight converter 220 determines a scaling factor based on the ratio. In an implementation, the scaling factor is the determined ratio. The weight converter 220 performs division or multiplication, rather than subtraction. In an implementation, the weight converter 220 determines a multiplicative product of an absolute value of the first magnitude of a particular weight value and the scaling factor. Therefore, the weight converter 220 determines the updated magnitudes of the weight values to be (160×0.696), (80×0.696), and (128×0.696). The updated magnitudes of the weight values are 111.30, 55.68, and 89.09. Now, the updated L1 norm is (111.30+55.68+89.09), or 256. The updated L1 norm is no longer greater than the weight magnitude limit of 256. The weight converter 220 stores these three updated weight values in the updated weight values 230, and sends the updated version of the weight value 222 (the value 89.09, and not the value 128) to the MAC circuit 240.

It is noted that the weight converter 220 can determine the scaling factor based on another ratio. For example, rather than use the weight magnitude limit of 256 in the numerator of the above ratio, the weight converter 220 can select a value less than the weight magnitude limit of 256. The weight converter 220 can select the numerator to be 255.8, 254, 250, or any other value less than the weight magnitude limit of 256 based on design requirements. It is also noted that in some implementations, for the adjustment value used for subtraction and for the numerator used for the scaling factor, weight converter 220 can select these values based on a size of the difference between the L1 norm and the weight magnitude limit.

In an implementation, when the difference between the L1 norm and the weight magnitude limit exceeds a threshold, the weight converter 220 can select the adjustment value or the numerator to create the weight converter 220 that increases a difference between the updated L1 norm and the weight magnitude limit. In some implementations, the weight converter 220 indexes into one or more lookup tables using the difference between the L1 norm and the weight magnitude limit to read out values that are used to determine the updated L1 norm prior to determining the updated weight values. The values stored in the one or more lookup tables can be based on prior analysis using statistics, gradient descent, linear fitting, and other techniques for optimally determining the updated weight values.

It is also noted that the weight converter 220 is capable of pruning one or more of the weight values when the L1 norm is greater than the weight magnitude limit. Therefore, the weight converter 220 zeroes out, or removes, one or more weight values while leaving other weight values unchanged. Continuing with the earlier example, the weight converter 220 can remove the first weight value of 160, or change its magnitude from 160 to 0, while maintaining the magnitudes of the other two weight values as 80 and 128. In yet other implementations, the weight converter 220 uses a respective adjustment value for each of the weight values when determining the updated magnitudes of the weight values. Therefore, the weight converter 220 does not use the same adjustment value for each of the weight values. Similarly, in other implementations, the weight converter 220 uses a respective scaling factor for each of the weight values when determining the updated magnitudes of the weight values. Therefore, the weight converter 220 does not use the same scaling factor for each of the weight values. In the pruning example, the scaling factor is 0 for the first weight value magnitude of 160, whereas, the scaling factor is 1 for each of the other two weight value magnitudes of 80 and 128. Other values for the respective scaling factors besides 0, 1 and 1 are possible and contemplated. For example, the weight converter 220 can use respective scaling factors of 0, 1 and 0, or 0.5, 0.8 and 0.7, and so on.

The weight converter 220 is capable of using a variety of algorithms for determining when to use a same adjustment value or a same scaling factor for multiple weight value magnitudes and when to use respective adjustment values or respective scaling factors for the multiple weight value magnitudes. Similarly, the weight converter 220 is capable of using a variety of algorithms for determining the respective adjustment values or respective scaling factors for the multiple weight value magnitudes. For example, when the weight converter 220 determines the difference between the L1 norm and the weight magnitude limit exceeds a threshold, the weight converter 220 can generate the above respective scaling factors of 0.5, 0.8 and 0.7 for the multiple weight value magnitudes. However, when the weight converter 220 determines the difference between the L1 norm and the weight magnitude limit does not exceed the threshold, the weight converter 220 can generate different respective scaling factors of or 0.9, 0.88 and 0.76 for the multiple weight value magnitudes.

Figure 3:
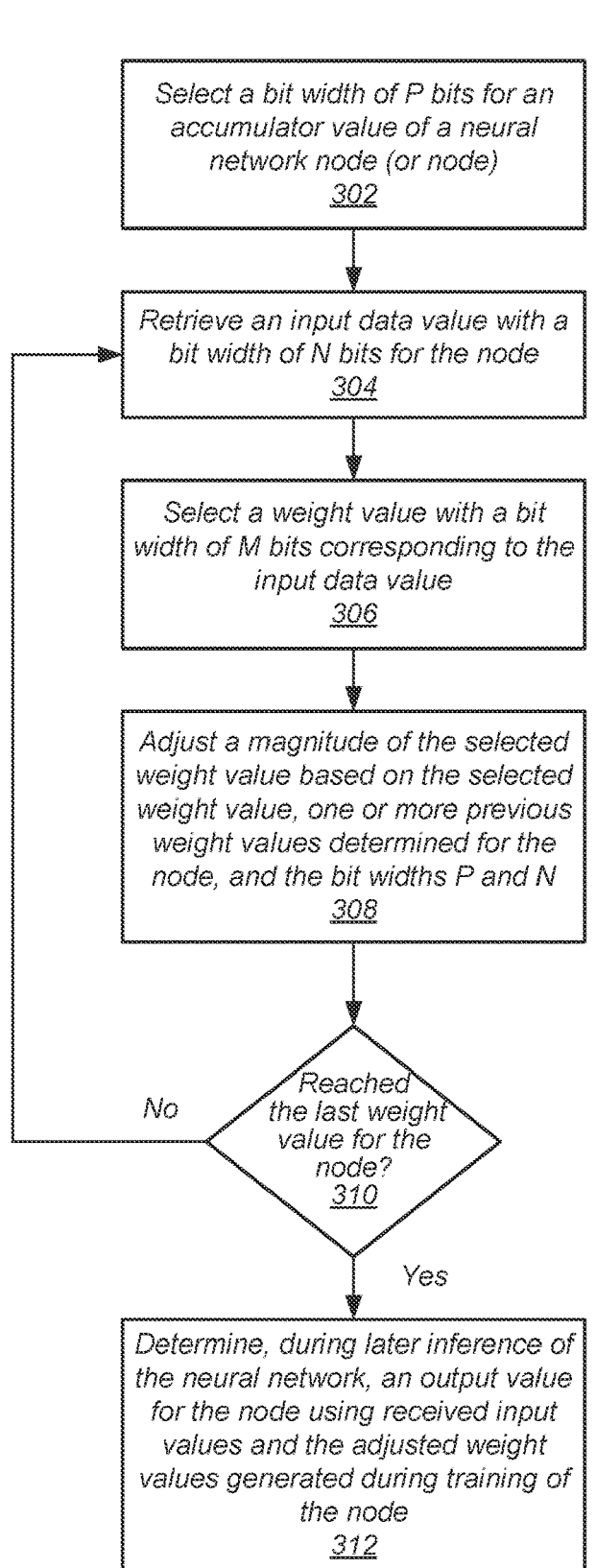
FIG. 3 is a generalized block diagram of a method for efficiently creating nodes that are less computationally intensive for a neural network.

Referring to FIG. 3, a generalized block diagram is shown of a method 300 for efficiently creating less computationally intensive nodes for a neural network. For purposes of discussion, the steps in this implementation (as well as in FIG. 5) are shown in sequential order. However, in other implementations some steps occur in a different order than shown, some steps are performed concurrently, some steps are combined with other steps, and some steps are absent.

Circuitry of a processor core of a data-parallel processing unit, or another type of integrated circuit, performs the data processing steps of a neural network. The circuitry selects a bit width of P bits for an accumulator value of a neuron, which is also referred to as a neural network node (or node) (block 302). The circuitry retrieves an input data value with a bit width of N bits for the node (block 304). It is noted that the maximum magnitude and the range of the input data values depends on whether the input data values use the signed data type or the unsigned data type. When the input data values are unsigned integers, and the input data values have a data size of N bits, such as 5 bits, then the range of the magnitudes of the input data values is 0 to $2^N - 1$, or (0 to $2^5 - 1$), or 0 to 31.

However, if the input data values have a data size of N bits, such as 5 bits, and the input data values are signed integers, then the range of the magnitudes of the input data values is $-2^{N-1}$ to $2^{N-1} - 1$, or $-2^{5-1}$ to $2^{5-1} - 1$, or $-2^4$ to $2^4 - 1$, or $-16$ to 15. In this case, the number of bits used to represent the magnitudes of input data values of the neural network node is 4 bits, since one bit is used to represent the sign of the signed integers. It is noted that the circuitry of the weight converter 220 (of FIG. 2) is also capable determining the bit width M used to generate the magnitudes of weight values of the neutral network node based on the data size of the input data values and whether the input data values are signed values or unsigned values.

The circuitry of the processor core selects a weight value with a bit width of M bits corresponding to the input data value (block 306). As described earlier, each of the neurons of the neural network combines a particular received input data value with a particular one of the weight values. The circuitry of the processor core adjusts a magnitude of the selected weight value based on multiple values such as the selected weight value, one or more previous weight values determined for the node, and the bit widths P and N (block 308). In various implementations, when each of the input data values and the weight values use the signed data type, the circuitry of the processor core determines a weight magnitude limit as two to a power of P less N, or $2^{(P-N)}$, and uses this weight magnitude limit to determine the updated magnitudes of the weight values. When the input data values use the unsigned data type and the weight values use the signed data type, the processor determines the weight magnitude limit as two to a power of P less N less one, or $2^{(P-N-1)}$. Therefore, rather than determine a limit of the bit width P of the accumulator by changing the bit width N of the integer input data values and the bit width M of the integer weight values, the circuitry of the processor core instead initially selects the bit width P of the accumulator. The circuitry of the processor core (or other type of integrated circuit), still updates the magnitudes of the weight values to prevent numerical overflow during later inference of the neural network. In various implementations, the circuitry of the processor core uses any one of the implementations described earlier for the weight converter 220 (of FIG. 2) for adjusting at least a magnitude of the selected weight value. As described earlier, these varying implementations (or varying weight value reduction techniques) determined one or more of an adjusted value to use in a subtraction operation, a scaling factor to use in a multiplication operation, a determination of whether to use respective adjustment values or respective scaling factors for the multiple weight values, and so forth.

If the circuitry did not yet reach the last weight value for the node ("no" branch of the conditional block 310), then control flow of method 300 returns to block 304 where the circuitry retrieves an input data value with a bit width of N bits for the node. If the circuitry reached the last weight value for the node ("yes" branch of the conditional block 310), then the circuitry determines, during later inference of the neural network, an output value for the node using received input values and the adjusted weight values generated during training of the node (block 312).

Figure 4:
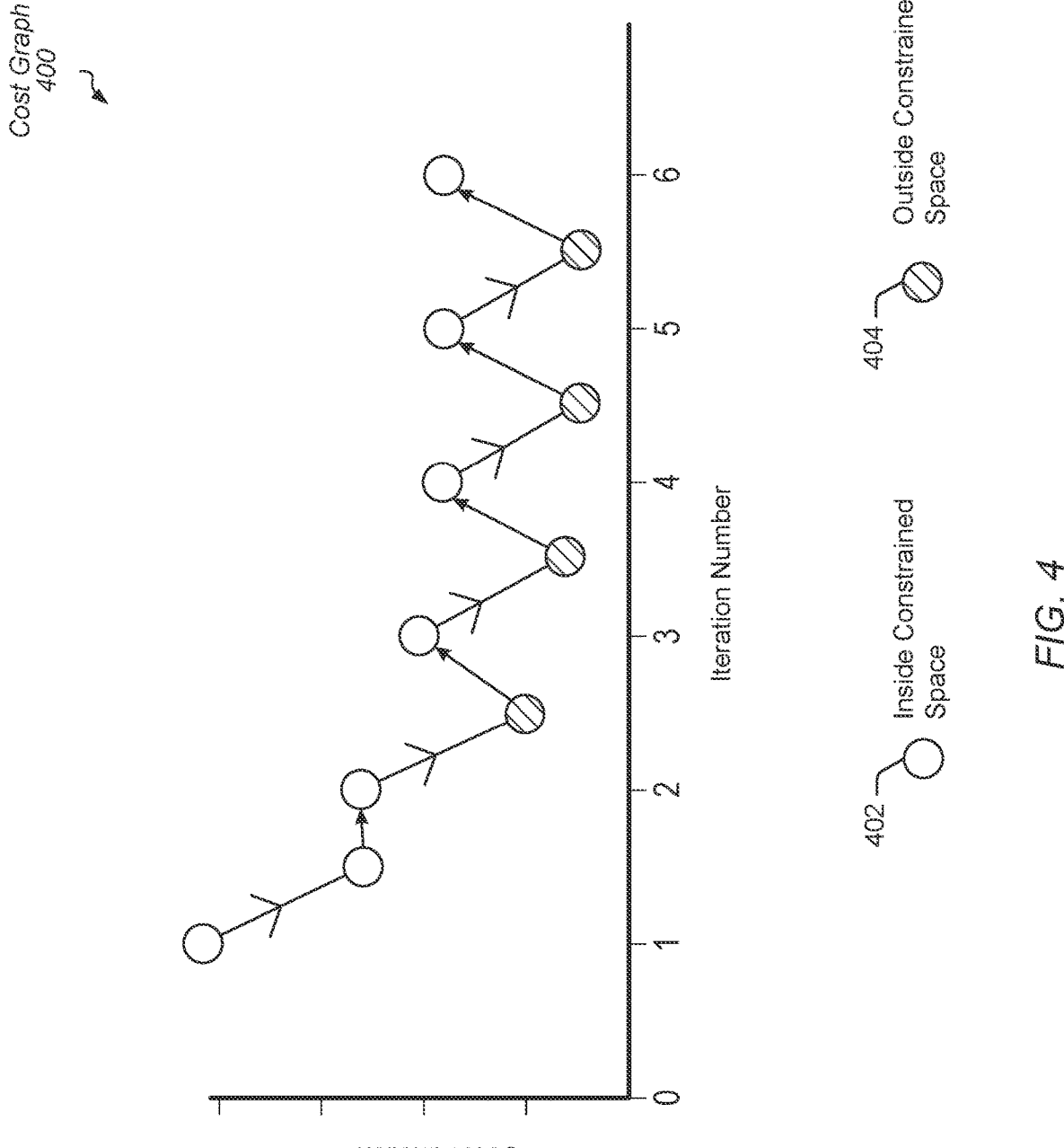
FIG. 4 is a generalized block diagram of a cost graph of a neuron being trained

Referring to FIG. 4, a generalized diagram is shown of a cost graph 400 of a neuron being trained. The y-axis of the cost graph 400 provides an indication of a cost function value during training of a neuron of a neural network. The x-axis of the cost graph 400 provides an indication of a number of iterations during training of the neuron. The indication of the cost function value specifies how inaccurate is the neuron when determining a relation between input data values and output data values of the neuron. In other words, the indication of the cost function value specifies how inaccurate is the prediction provided by the neuron during a particular iteration number.

As the number of iterations increases, the cost function value decreases, which indicates the neuron is improving its predictions. The data points in the cost graph 400 are one of two types such as type 402 and type 404. The type 402 indicates the neuron is inside the constrained space of eventually converging, whereas, the type 404 is outside the constrained space of eventually converging. For example, when numerical overflow occurs for the neuron's intermediate values, inaccuracies are introduced, and the cost function value no longer tracks a path toward convergence. When the neuron updates weight values as described earlier for the weight converter 220 (of FIG. 2), and the weight value causes the L1 norm to exceed the weight magnitude limit, the corresponding data point in the cost graph 400 is the type 404. However, the weight converter adjusts multiple weight values to cause the L1 norm to no longer exceed the weight magnitude limit. Thus, the cost graph moves from a data point of type 404 to a data point of type 402. Such a transition indicates that the neuron can allow the data size (bit width P) of the accumulator register to be set prior to training the neuron, and also prevent numerical overflow during later inference of the neural network.

Referring to FIG. 5, a generalized block diagram is shown of a method 500 for adjusting magnitudes of weight values of a neural network while maintaining a fixed size of accumulator values. Circuitry of a processor core of a data-parallel processing unit, or another type of integrated circuit, performs the data processing steps of a neural network such as a neural network. The integrated circuit selects a bit width of P bits for an accumulator value of a neural network node (or node) that receives input data values with a bit width of N bits (block 502). The integrated circuit determines a weight magnitude limit that is 2 to the power of P less N, or $2^{(P-N)}$ (block 504). However, when the input data values use the unsigned data type and the weight values use the signed data type, the integrated circuit determines a weight magnitude limit as two to a power of P less N less one, or $2^{(P-N-1)}$. The integrated circuit selects a weight value with a bit width of M bits (block 506). In an implementation, the selected weight value is a received value of multiple initial weight values. In another implementation, the selected weight value is a value determined by an intermediate stage or iteration of the node during training, but has not yet been stored as a weight value to use for subsequent iterations.

The integrated circuit determines an L1 norm that is an L1 norm value of the weight values currently being used in the node (block 508). The integrated circuit determines the L1 norm value as a sum of the absolute value of the magnitude of the current weight value and the absolute values of one or more magnitudes of the one or more weight values determined beforehand in the node. If the integrated circuit determines that the L1 norm value is not greater than the weight magnitude limit ("no" branch of the conditional block 510), and the integrated circuit has not yet reached the last weight value for the node ("no" branch of the conditional block 520), then control flow of method 500 returns to block 506 where the integrated circuit selects a weight value with a bit width of M bits. If the integrated circuit determines that the L1 norm value is not greater than the weight magnitude limit ("no" branch of the conditional block 510), and the integrated circuit has reached the last weight value for the node ("yes" branch of the conditional block 520), then the integrated circuit determines, during later inference of the neural network, an output value for the node using received input values and the adjusted weight values generated during training of the node (block 522).

If the integrated circuit determines that the L1 norm value is greater than the weight magnitude limit ("yes" branch of the conditional block 510), then the integrated circuit determines a difference that is the L1 norm less the weight magnitude limit (block 512). The integrated circuit determines an average value that is the difference divided by the number of weight values currently being used in the node (block 514). The integrated circuit rounds up the average value to the nearest integer (block 516). The integrated circuit subtracts the average value from an absolute value of each of the weight values currently being used in the node (block 518). It is noted that the steps described in blocks 512-518 provide one weight value reduction technique to generate adjusted magnitudes of the weight values. However, the integrated circuit is capable of using a variety of other weight value reduction techniques to generate adjusted magnitudes of the weight values. For example, in various implementations, the integrated circuit uses any one of the other weight value reduction techniques described earlier for the weight converter 220 (of FIG. 2) for generating adjusted magnitudes of the weight values. Afterward, control flow of method 500 moves to conditional block 520 where the integrated circuit determines whether to determine more weight values for the node. It is noted that different hidden layers can have different data sizes (different values of the bit width P) of the accumulator registers. Therefore, the neurons of different hidden layers have different values of the bit width P selected in block 502. Additionally, in some implementations, different hidden layers use different weight value reduction techniques.

Figure 6:
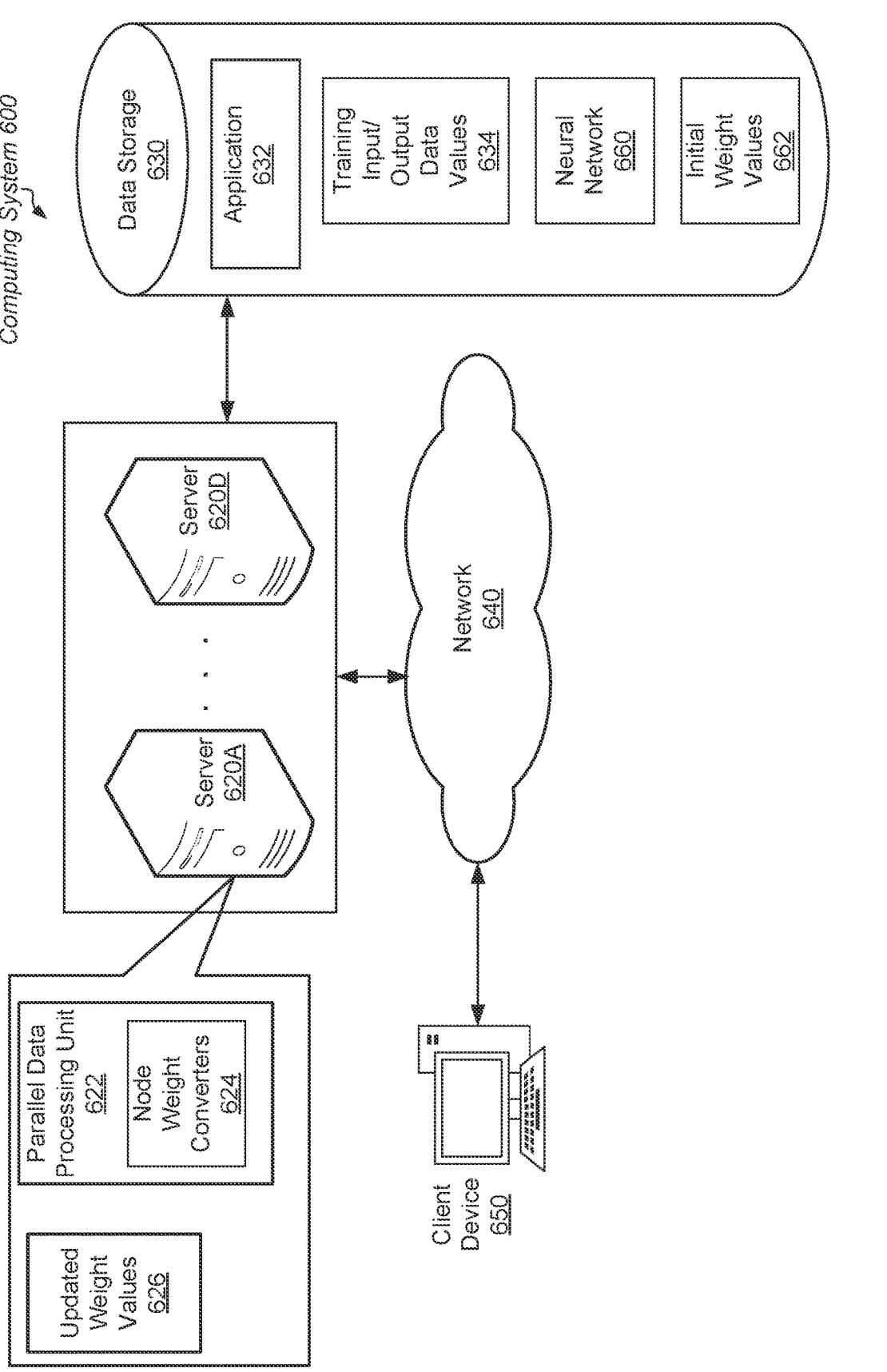
FIG. 6 is a generalized block diagram of a computing system.

Turning now to FIG. 6, a generalized diagram is shown of a computing system 600. In the illustrated implementation, the computing system 600 includes the client computing device 650, a network 640, the servers 620A-620D, and the data storage 630 that includes a copy of a neural network 660 and corresponding training input/output data values 634 and initial weight values 662. As shown, the server 620A includes a data-parallel processing unit 622 with circuitry that performs the steps of node weight converters 624. The node weight converters 624 generate the updated weight values 626. In other implementations, the server 620A uses another type of integrated circuit to perform the steps of the node weight converters 624. In various implementations, the node weight converters 624 include similar functionality as described earlier for the weight converter 220 (of FIG. 2).

Although a single client computing device 650 is shown, any number of client computing devices utilize an online business, such as application 632, through the network 640. The client device 650 includes hardware circuitry such as a processing unit for processing instructions of computer programs. Examples of the client device 650 are a laptop computer, a smartphone, a tablet computer, a desktop computer, or other. In some implementations, the client device 650 includes a network interface (not shown) supporting one or more communication protocols for data and message transfers through the network 640. The network 640 includes multiple switches, routers, cables, wireless transmitters and the Internet for transferring messages and data. Accordingly, the network interface of the client device 650 support at least the Hypertext Transfer Protocol (HTTP) for communication across the World Wide Web.

In some implementations, an organizational center (not shown) maintains the application 632. In addition to communicating with the client device 650 through the network 640, the organizational center also communicates with the data storage 630 for storing and retrieving data. Through user authentication, users are able to access resources through the organizational center to update user profile information, access a history of purchases or other accessed content, and download content for purchase.

The servers 620A-620D include a variety of server types such as database servers, computing servers, application servers, file servers, mail servers and so on. In various implementations, the servers 620A-620D and the client device 650 operate with a client-server architectural model. In various implementations, the application 632 includes a neural network application programming interface (API) that the designer at the client device 650 uses to specify multiple characterizing parameters. Examples of these parameters are a number of input data values in the values 634 to send to an input layer of the neural network 660 during training, an identifier specifying which set of initial weight values to use as the initial weight values 662 for training the neural network 660, a number of hidden layers for the neural network 660, a number of nodes or neurons for each of the hidden layers, an indication of an activation function to use in each of the hidden layers, and so on. Afterward, when the user at the client device 650 initiates training of the neural network 660 to be performed by one or more of the servers 620A-620D, the node weight converters 624 allow the data size (bit width P) of the accumulator registers to be set prior to training neurons of the neural network 660, and also prevent numerical overflow. It is noted that different hidden layers can have different data sizes (different values of the bit width P) of the accumulator registers.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
circuitry configured to:
    select a first weight value with a first magnitude, based at least in part on an input data value used for training a node of a neural network;
    replace the first weight value with a second weight value that has a second magnitude different from the first magnitude, based at least in part on the first magnitude and one or more magnitudes of a first set of weight values comprising one or more weight values generated previously for the node; and
    generate an output value for the node based at least in part on the second magnitude.

2. The apparatus as recited in claim 1, wherein the circuitry is further configured to replace the first set of weight values with a second set of weight values that have one or more magnitudes less than a corresponding one of the one or more magnitudes of the first set of weight values.

3. The apparatus as recited in claim 2, wherein the second magnitude is less than the first magnitude.

4. The apparatus as recited in claim 1, wherein the circuitry is further configured to:
    receive a bit width P of an accumulator value used in the node; and
    generate a weight magnitude limit as two to a power of P less N, wherein:
        N is a bit width of input data values of the node; and
        each of P and N is a positive, non-zero integer.

5. The apparatus as recited in claim 4, wherein the circuitry is further configured to replace the first magnitude with the second magnitude, in response to determining a first sum of absolute values of the first magnitude and the one or more magnitudes of the first set of weight values is greater than the weight magnitude limit.

6. The apparatus as recited in claim 5, wherein the circuitry is further configured to:
    generate a difference between the first sum and the weight magnitude limit;
    generate an average value by dividing the difference by a second sum of a number of weight values in the first set of weight values and one for the first weight value;
    generate an adjustment value based at least in part on the average value; and
    generate the second magnitude as an absolute value of the first magnitude less the adjustment value.

7. The apparatus as recited in claim 5, wherein the circuitry is further configured to:
    generate a ratio by dividing the weight magnitude limit by the first sum;
    generate a scaling factor based at least in part on the ratio; and
    generate the second magnitude is a multiplicative product of an absolute value of the first magnitude and the scaling factor.

8. A method, comprising:
    storing, by circuitry of a memory, a plurality of input data values for a neural network;
    selecting, by circuitry of a processor, a first weight value with a first magnitude, based at least in part on an input data value used for training a node of a neural network; and
    replacing, by the circuitry, the first weight value with a second weight value that has a second magnitude different from the first magnitude, based at least in part on the first magnitude and one or more magnitudes of a first set of weight values comprising one or more weight values generated previously for the node; and
    generating, by the circuitry, an output value for the node based at least in part on the second magnitude.

9. The method as recited in claim 8, further comprising replacing, by the circuitry, the first set of weight values with a second set of weight values that have one or more magnitudes less than a corresponding one of the one or more magnitudes of the first set of weight values.

10. The method as recited in claim 9, wherein the second magnitude is less than the first magnitude.

11. The method as recited in claim 8, further comprising:
    receiving, by the circuitry, a bit width P of an accumulator value used in the node; and
    generating, by the circuitry, a weight magnitude limit as two to a power of P less N, wherein:
        N is a bit width of input data values of the node; and
        each of P and N is a positive, non-zero integer.

12. The method as recited in claim 11, further comprising replacing, by the circuitry, the first magnitude with the second magnitude, in response to determining a first sum of absolute values of the first magnitude and the one or more magnitudes of the first set of weight values is greater than the weight magnitude limit.

13. The method as recited in claim 12, further comprising:

generating, by the circuitry, a difference between the first sum and the weight magnitude limit;

generating, by the circuitry, an average value by dividing the difference by a second sum of a number of weight values in the first set of weight values and one for the first weight value;

generating, by the circuitry, an adjustment value based at least in part on the average value; and generating, by the circuitry, the second magnitude as an absolute value of the first magnitude less the adjustment value.

14. The method as recited in claim 13, further comprising:

generating, by the circuitry, a ratio by dividing the weight magnitude limit by the first sum;

generating, by the circuitry, a scaling factor based at least in part on the ratio; and generating, by the circuitry, the second magnitude is a multiplicative product of an absolute value of the first magnitude and the scaling factor.

15. A computing system comprising:

a memory comprising circuitry configured to store a plurality of input data values for training a neural network;

a processor comprising circuitry configured to:

select a first weight value with a first magnitude, based at least in part on an input data value of the plurality of input data values used for training a node of a neural network;

replace the first weight value with a second weight value that has a second magnitude different from the first magnitude, based at least in part on the first magnitude and one or more magnitudes of a first set of weight values comprising one or more weight values generated previously for the node; and generate an output value for the node based at least in part on the second magnitude.

16. The computing system as recited in claim 15, wherein the circuitry is further configured to replace the first set of weight values with a second set of weight values that have one or more magnitudes less than a corresponding one of the one or more magnitudes of the first set of weight values.

17. The computing system as recited in claim 16, wherein the second magnitude is less than the first magnitude.

18. The computing system as recited in claim 15, wherein the circuitry is further configured to:

receive a bit width P of an accumulator value used in the node; and generate a weight magnitude limit as two to a power of P less N, wherein:

N is a bit width of input data values of the node; and each of P and N is a positive, non-zero integer.

19. The computing system as recited in claim 18, wherein the circuitry is further configured to replace the first magnitude with the second magnitude, in response to determining a first sum of absolute values of the first magnitude and the one or more magnitudes of the first set of weight values is greater than the weight magnitude limit.

20. The computing system as recited in claim 19, wherein the circuitry is further configured to:

generate a difference between the first sum and the weight magnitude limit;

generate an average value by dividing the difference by a second sum of a number of weight values in the first set of weight values and one for the first weight value;

generate an adjustment value based at least in part on the average value; and generate the second magnitude as an absolute value of the first magnitude less the adjustment value.

\* \* \* \* \*